(12) United States Patent
Matsubara et al.

(10) Patent No.: US 7,998,022 B2
(45) Date of Patent: Aug. 16, 2011

(54) CONTROL DEVICE FOR VEHICULAR POWER TRANSMITTING APPARATUS

(75) Inventors: Tooru Matsubara, Toyota (JP); Hiroyuki Shibata, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 679 days.

(21) Appl. No.: 12/081,822

(22) Filed: Apr. 22, 2008

(65) Prior Publication Data

US 2008/0269010 A1 Oct. 30, 2008

(30) Foreign Application Priority Data

Apr. 27, 2007 (JP) .................. 2007-120020

(51) Int. Cl.
*B60W 10/10* (2006.01)
(52) U.S. Cl. .................. 477/5; 477/6; 477/8
(58) Field of Classification Search .................. 477/3, 5, 477/6, 8
See application file for complete search history.

(56) References Cited

U.S. PATENT DOCUMENTS

| 2009/0042689 A1* | 2/2009 | Soliman et al. .................... 477/5 |
| 2009/0140521 A1* | 6/2009 | Bryan et al. .................... 290/31 |
| 2010/0228412 A1* | 9/2010 | Sah .................... 701/22 |

FOREIGN PATENT DOCUMENTS

JP     A 2005-264762     9/2005

\* cited by examiner

*Primary Examiner* — Ha D. Ho
(74) *Attorney, Agent, or Firm* — Oliff & Berridge, PLC

(57) ABSTRACT

A control device for a vehicle which includes a differential portion controlling a differential state between the number of rotations of an input shaft connected to an engine, and the number of rotations of an output shaft connected to drive wheels, with controlling an operating state of an electric motor, and an automatic shifting portion forming part of a power transmitting path. The control device prevents degradation in operability of the vehicle, even in the presence of a shifting command resulting from a manual shift operation when the automatic shifting portion remains under a limited shifting state. More particularly, if the shifting command is present due to the manual shift operation, the differential state of the differential portion is controlled, thereby causing a variation in a drive force at a rate corresponding to the shifting command.

18 Claims, 8 Drawing Sheets

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL DEVICE FOR VEHICULAR POWER TRANSMITTING APPARATUS

BACKGROUND OF THE INVENTION

1. Field of the invention

This invention relates to a control device for a vehicular power transmitting apparatus. The vehicular power transmitting apparatus includes an electrically controlled differential portion and a shifting portion forming part of a power transmitting path. The electrically controlled differential portion controls a differential state between the number of rotations of an input shaft connected to an internal combustion engine, and the number of rotations of an output shaft connected to drive wheels, with controlling an operating state of an electric motor connected to a rotary element of a differential portion in power trasmissive state. More particularly, the present invention relates to a technology related to the control device for ensuring a variation in drive force during a manual shift operation with the shifting portion remaining under a disabled shifting state.

2. Description of the Related Art

There has been known a vehicular power transmitting apparatus including an electrically controlled differential portion controlling a differential state between the number of rotations of an input shaft connected to an internal combustion engine, and the number of rotations of an output shaft connected to drive wheels, with controlling an operating state of an electric motor connected to a rotary element of a differential portion in power trasmissive state, and a shifting portion forming part of a power transmitting path. For instance, Patent Publication 1 (Japanese Patent Application Publication No. 2005-264762) discloses such a vehicular power transmitting apparatus. With the vehicular power transmitting apparatus disclosed in Patent Publication 1, regeneration-efficiency optimizing control means controls during a coast running condition a speed ratio of an automatic shifting portion to optimize regeneration efficiency to thereby accomplish improved fuel consumption.

By the way, when requiring a drive force or an engine bake force for a vehicle, driver usually performs a manual shift operation to effectuate, for instance, a downshift in the vehicular power transmitting apparatus. However, the shifting is restricted or limited due to various factors such as a disabled shifting state caused by a failure or another disabled shifting state resulting from an overspeed rotation or the like. For instance, the shift portion encounters a difficulty of switching a gear position or a speed ratio. In such likelihood, no decelerating drive force (engine brake) can be obtained, resulting in a probability with the occurrence of degraded operability of the vehicle.

SUMMARY OF THE INVENTION

The present invention has been completed with the above views in mind, and has an object to provide a control device for a vehicular power transmitting apparatus. The vehicular power transmitting apparatus has an electrically controlled differential portion controlling a differential state between the number of rotations of an input shaft connected to an internal combustion engine, and the number of rotations of an output shaft connected to drive wheels, with controlling an operating state of an electric motor connected to a rotary element of a differential portion in power trasmissive state, and a shifting portion forming part of a power transmitting path. The control device provides no degraded operability of a vehicle in the presence of a shifting command even if the shifting portion remains under a restricted i.e. limited shifting state.

For achieving the above object, a first aspect of the present invention, related to a control device for a vehicular power transmitting apparatus, is featured by that the vehicular power transmitting apparatus comprises an electrically controlled differential portion controlling a differential state between the number of rotations of an input shaft connected to a drive-force generating engine, and the number of rotations of an output shaft connected to drive wheels, with controlling an operating state of an electric motor connected to a rotary element of a differential portion, and a shifting portion forming part of a power transmitting path.

Also, the first aspect is featured by that the control device is operative to control the differential state of the electrically controlled differential portion in the presence of a shifting command when the shifting portion remains under a limited shifting, for thereby causing a variation in a drive force at a rate corresponding to the shifting command.

In a second aspect, the shifting command is generated in response to a shifting operation of a driver.

In a third aspect, the control device varies the number of rotations of the drive-force generating engine for thereby controlling the differential state of the electrically controlled differential portion.

In a fourth aspect, the control device varies a power generating state of the electric motor for thereby controlling the differential state of the electrically controlled differential portion.

In a fifth aspect, the control device selectively alters the number of rotations of the drive-force generating engine or alters the power generating state of the electric motor depending on a charged sate of a battery for thereby controlling the differential state of the electrically controlled differential portion.

In a sixth aspect, the control device selectively alters the number of rotations of the drive-force generating engine or alters the power generating state of the electric motor depending on a state of the drive-force generating engine for thereby controlling the differential state of the electrically controlled differential portion.

In a seventh aspect, the shifting portion of the vehicular power transmitting apparatus comprises a mechanical type transmission that varies a speed ratio with varying a torque transmitting path.

In an eighth aspect, the electrically controlled differential portion of the vehicular power transmitting apparatus operates to serve as a continuously variable transmission with controlling an operating state of the electric motor.

With the control device for a vehicular power transmitting apparatus of the first aspect, if the shifting command is present when the shifting portion remains under the restricted i.e. limited shifting state, the control device operates to control the differential state of the electrically controlled differential portion. This allows the drive force to be generated at a varying rate in line with the shifting command, which appropriately prevents the occurrence of degradation in operability of the vehicle.

With the control device for a vehicular power transmitting apparatus of the second aspect, the shifting command is generated in response to the shifting operation of the driver. This enables the drive force to be generated at the varying rate in line with the shifting command of the driver, appropriately preventing the occurrence of degradation in operability of the vehicle.

With the control device for a vehicular power transmitting apparatus in the third aspect, the control device varies the number of rotations of the drive-force generating engine for thereby controlling the differential state of the electrically controlled differential portion. Thus, varying the number of rotations of the drive-force generating engine allows the drive force to vary in line with the shifting command.

With the control device for a vehicular power transmitting apparatus of the fourth aspect, the control device varies the power generating state of the electric motor for thereby controlling the differential state of the electrically controlled differential portion. Thus, varying the power generating state of the electric motor allows the drive force to vary in line with the shifting command.

With the control device for a vehicular power transmitting apparatus of a fifth aspect, the control device selectively alters the number of rotations of the drive-force generating engine or alters the power generating state of the electric motor, depending on a charge state of a battery for thereby controlling the differential state of the electrically controlled differential portion. Thus, selectively altering the number of rotations of the drive-force generating engine or altering the power generating state of the electric motor depending on the charged sate of the battery, allows the drive force to vary in line with the shifting command.

With the control device for a vehicular power transmitting apparatus of the sixth aspect, the control device selectively alters the number of rotations of the drive-force generating engine or alters the power generating state of the electric motor, depending on the state of the drive-force generating engine for thereby controlling the differential state of the electrically controlled differential portion. Therefore, selectively altering the number of rotations of the drive-force generating engine or altering the power generating state of the electric motor depending on the state of the drive-force generating engine, allows the drive force to vary in line with the shifting command regardless the power generating state of the drive-force generating engine.

With the control device for a vehicular power transmitting apparatus of the seventh aspect, the shifting portion comprises the mechanical type transmission that varies the speed ratio with varying the torque transmitting path. Therefore, rendering the electrically controlled differential portion operative as the continuously variable transmission allows a whole of the vehicular power transmitting apparatus to infinitely vary the speed ratio, thereby obtaining the drive force in a continuously variable fashion.

With the control device for a vehicular power transmitting apparatus of the eighth aspect, the electrically controlled differential portion of the vehicular power transmitting apparatus operates to serve as the continuously variable transmission with controlling the operating state of the electric motor, enabling drive torque to smoothly vary. In addition, the electrically controlled differential portion not only has a function to operate as an electrically controlled continuously variable transmission with the speed ratio being continuously varied, but also has a function to operate as a step-variable transmission with varying the speed ratio step-by-step.

Preferably, the rotary element of the differential portion includes a planetary gear unit having three rotary elements involving a first rotary element connected to the input shaft and the engine, a second rotary element connected to the first electric motor, and a third rotary element connected to the output shaft. The first rotary element includes a carrier of the planetary gear unit; the second rotary element includes a sun gear of the planetary gear unit; and the third rotary element includes ring gear of the planetary gear unit. With such a structure, the differential mechanism can have a minimized dimension in an axial direction. In addition, the differential mechanism can be simply structured with one planetary gear unit.

More preferably, the planetary gear unit includes a single pinion type planetary gear unit. With such a structure, the differential mechanism can have a minimized dimension in an axial direction. In addition, the differential mechanism can be simply structured with one single pinion type planetary gear unit.

More preferably, the vehicular power transmitting apparatus provides an overall speed ratio that is established based on the speed ratio (gear ratio) of the shifting portion and the speed ratio of the electrically controlled differential portion. With such a structure, utilizing the speed ratio of the shifting portion allows the drive force to be obtained in a wide range.

More preferably, the shifting portion includes a step-variable planetary gear type automatic power transmission. With such a structure, the continuously variable transmission can be structured with the electrically controlled differential portion, rendered operative as, for instance, the electrically controlled continuously variable transmission, and the step-variable type automatic power transmission, thereby making it possible to smoothly vary the drive torque. In addition, with the electrically controlled differential portion held in a controlled state to keep a constant speed ratio, the electrically controlled differential portion and the step-variable type automatic power transmission establish a state, equivalent to the step-variable transmission. This enables the vehicular power transmitting apparatus to have the overall speed ratio that can be varied step-by-step to rapidly obtain drive torque.

DETAILED DESCRIPTION OF THE PREFERRED EMBODIMENTS

Now, various embodiments according to the present invention will be described below in detail with reference to the accompanying drawings.

Embodiment

Figures 1, 2:
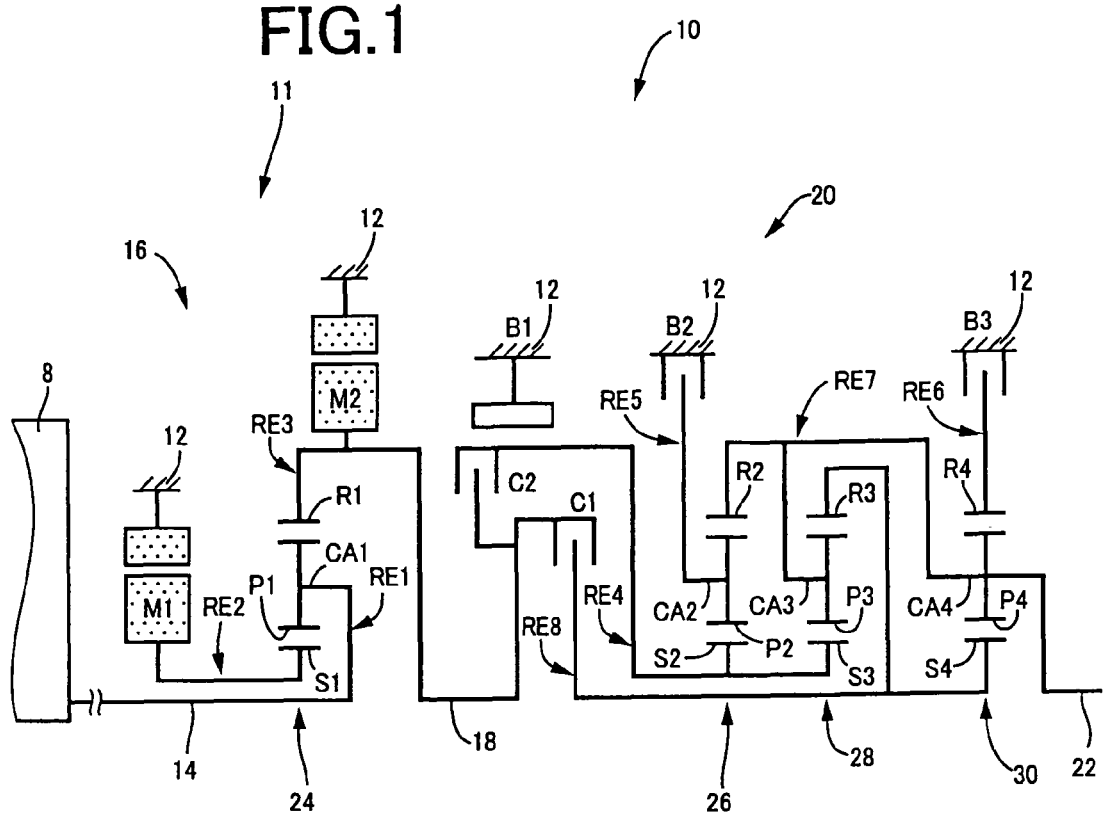
FIG. 1 is a skeleton diagram showing structure of a vehicular power transmitting apparatus of one embodiment according to the present invention for use in a hybrid vehicle.
FIG. 2 is a functional diagram illustrating combined operations of hydraulically operated frictional coupling devices for use in the vehicular power transmitting apparatus shown in FIG. 1.

FIG. 1 is a skeleton diagram for illustrating a transmission mechanism i.e., shifting mechanism 10 constituting a part of a power transmitting apparatus for a hybrid vehicle to which the present invention is applied. As shown in FIG. 1, the transmission mechanism 10 includes a transmission case 12 (hereinafter referred to as "a case 12") mounted on a vehicle body as a non-rotary member, an input shaft 14 disposed inside the case 12 as an input rotary member, a differential portion 11 coaxially connected to the input shaft 14 either directly, or indirectly via a pulsation absorbing damper (vibration damping device), not shown, and serving as a continuously variable transmission portion, an automatic transmission portion 20 connected in series in a power transmitting path between the differential portion 11 and drive wheels 34 (see FIG. 7) through a power transmitting member 18 (power transmitting shaft), and an output shaft 22 connected to the automatic transmission portion 20 and serving as an output rotary member.

The transmission mechanism 10 is suitably applied to an FR (front-engine and reverse-drive) type vehicle and mounted on a vehicle along a fore and aft direction thereof. The transmission mechanism 10 is disposed between an engine 8 and a pair of drive wheels 34. The engine 8 includes an internal combustion engine such as a gasoline engine or a diesel engine or the like and serves as a drive-power source. The engine 8 is directly connected to the input shaft 12 in series or indirectly through the pulsation absorbing damper (vibration damping device), not shown. This allows a vehicle drive force to be transferred from the engine 8 to the pair of drive wheels 34 in sequence through a differential gear device 32 (final speed reduction gear) (see FIG. 7) and a pair of drive axles.

With the transmission mechanism 10 of the illustrated embodiment, the engine 8 and the differential portion 11 are directly connected to each other. As used herein, the term "directly connected to each other" refers to a structure under which a direct connection is established between the associated component parts in the absence of a fluid-operated power transmitting device, such as a torque converter or a fluid coupling device or the like, and a connection including, for instance, the pulsation absorbing damper is involved in such a direction connection. It is noted that a lower half of the transmission mechanism 10, which is constructed symmetrically with respect to its axis, is omitted in FIG. 1. This is also true for the other embodiments of the invention described below.

The differential portion 11 includes a first electric motor M1, a power distributing mechanism 16, structured in a mechanical mechanism for mechanically distributing an output of the engine 8 applied to the input shaft 14, which functions as a differential mechanism through which the engine output is distributed to the first electric motor M1 and the power transmitting member 18, and a second electric motor M2 operatively connected to the power transmitting member 18 to be unitarily rotate therewith. In the illustrated embodiment, both the first and second electric motors M1 and M2 are so-called motor/generators each having a function to generate electric power. The first electric motor M1 has at least a function as an electric power generator for generating a reaction force. The second electric motor M2 has at least a function as a motor (electric motor) serving as a running drive power source to output a vehicle drive force.

The power distributing mechanism 16 includes, as a major component, a first planetary gear set 24 of a single pinion type having a gear ratio $\rho 1$ of about 0.418, for example. The first planetary gear set 24 has rotary elements (elements) composed of a first sun gear S1, a first planetary gear P1, a first carrier CA1 supporting the first planetary gear P1 such that the first planetary gear P1 is rotatable about its axis and about the axis of the first sun gear S1, and a first ring gear R1 meshing with the first sun gear S1 through the first planetary gear P1. Where the numbers of teeth of the first sun gear S1 and the first ring gear R1 are represented by ZS1 and ZR1, respectively, the above gear ratio $\rho 1$ is represented by ZS1/ZR1.

With the power distributing mechanism 16, a first carrier CA1 is connected to the input shaft 14, i.e., the engine 8; a first sun gear S1 is connected to the first electric motor M1; and a first ring gear R1 is connected to the power transmitting member 18. With the power distributing mechanism 16 of such a structure, the three elements of the first planetary gear set 24, i.e., the first sun gear S1, the first planetary gear P1, the first carrier CA1 and the first ring gear R1 are arranged to rotate relative to each other for initiating a differential action, i.e., in a differential state under which the differential action is initiated. This allows the engine output to be distributed to the first electric motor M1 and the power transmitting mechanism 18. Then, a part of the distributed engine output drives the first electric motor M1 to generate electric energy, which is stored and used for rotatably driving the second electric motor M2.

Thus, the differential portion 11 (power distributing mechanism 16) is caused to function as an electric differential device such that, for instance, the differential portion 11 is placed in a so-called continuously variable shifting state (electrically established CVT state) to continuously vary the rotation of the power transmitting member 18 regardless of the engine 8 operating at a given rotational speed. That is, the differential portion 11 functions as an electrically controlled continuously variable transmission to provide a speed ratio $\gamma 0$ (rotational speed $N_{IN}$ of the input shaft 14/rotational speed $N_{18}$ of the power transmitting member 18) that is continuously variable from a minimum value $\gamma 0 \min$ to a maximum value $\gamma 0 \max$. In this way, the first electric motor M1, the second electric motor M2 and the engine 8 all connected to the power distributing mechanism 16 (differential portion 11) are controlled in the driving conditions thereof, so that the differential state of the rotation speeds i.e. rotational speeds of the input shaft 14 and the transmitting member 18 is controlled.

The automatic transmission portion 20 includes a single-pinion type second planetary gear set 26, a single-pinion type third planetary gear set 28 and a single-pinion type fourth planetary gear set 30. The automatic transmission portion 20 is a planetary gear type multiple-step transmission operable as a step-variable automatic transmission. The second planetary gear set 26 has a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a given gear ratio ρ2 of about "0.562". The third planetary gear set 28 has a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a given gear ratio ρ3 of about "0.425".

The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a given gear ratio ρ4 of, for instance, about "0.421". With the second sun gear S2, second ring gear R2, third sun gear S3, third ring gear R3, fourth sun gear S4 and fourth ring gear R4 having the numbers of gear teeth represented by ZS2, ZR2, ZS3, ZR3, ZS4 and ZR4, respectively, the gear ratios ρ2, ρ3 and ρ4 are expressed by ZS2/ZR2, ZS3/ZR3, and ZS4/ZR4, respectively.

In the automatic transmission portion 20, the second and third sun gears S2, S3 are integrally connected to each other, selectively connected to the power transmitting member 18 through a second clutch C2, and selectively connected to the casing 12 through a first brake B1. The second carrier CA2 is selectively connected to the casing 12 through a second brake B2, and the fourth ring gear R4 is selectively connected to the casing 12 through a third brake B3. The second ring gear R2, third carrier CA3 and fourth carrier CA4 are integrally connected to each other and connected to the output shaft 22. The third ring gear R3 and the fourth sun gear S4 are integrally connected to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to establish each gear position (shift gear position) in the automatic transmission portion 20. In other words, the first and second clutches C1, C2 function as coupling devices i.e., engaging device operable to place the power transmitting path between the power transmitting member 18 and the automatic transmission portion 20, that is, the power transmitting path between the differential portion 11 (power transmitting member 18) and the drive wheels 34, selectively in one of a power transmitting state in which the vehicle drive force can be transmitted through the power transmitting path, and the power cut-off state in which the vehicle drive force cannot be transmitted through the power transmitting path. That is, with at least one of the first and second clutches C1 and C2 brought into coupling engagement, the power transmitting path is placed in the power transmitting state. In contrast, uncoupling both the first and second clutches C1 and C2 places the power transmitting path in the power cut-off state.

With the automatic transmission portion 20, further, uncoupling an on-uncoupling coupling device while coupling an on-coupling coupling device allows a so-called "clutch-to-clutch" shifting action to be executed for respective gear positions to be selectively established. This allows a speed ratio γ (rotational speed $N_{18}$ of the power transmitting member 18/rotational speed $N_{OUT}$ of the output shaft 22) to be obtained in equally varying ratio for each gear position. As indicated in the coupling operation table shown in FIG. 2, coupling the first clutch C1 and third brake B3 establishes 1st-speed gear position having a speed ratio γ1 of approximately, for instance, "3.357".

With the first clutch C1 and second brake B3 coupled in operation, a 2nd-speed gear position is established with a speed ratio γ2 of, for instance, approximately "2.180", which is lower a value of the speed ratio γ1. With the first clutch C1 and first brake B1 coupled in operation, a 3rd-speed gear position is established with a speed ratio γ3 of, for instance, approximately "1.424", which is lower a value of the speed ratio γ2. Coupling the first clutch C1 and second clutch C2 establishes a 4th-speed gear position with a speed ratio γ4 of, for instance, approximately "1.000", which is lower than the speed ratio γ3. Coupling the second clutch C2 and third brake B3 establishes a reverse-drive gear position (reverse-drive shift position) with a speed ratio γR of, for instance, approximately 3.209, which is intermediate between those of the 1st-speed gear position and the 2nd-speed gear position. In addition, uncoupling i.e., disengaging or releasing the first clutch C1, second clutch C2, first brake B1, second brake B2 and third brake B3 allows a neutral position N to be established.

The first clutch C1, second clutch C2, first brake B1, second brake B2 and third brake B3 (hereinafter collectively referred to as clutch C and brake B, unless otherwise specified) are hydraulically operated frictional coupling devices that are used in the related art vehicular automatic transmission. Each of these frictional coupling devices may include a wet-type multiple-disc clutch, having a plurality of mutually overlapping friction plates adapted to be pressurized against each other by a hydraulic actuator, or a band brake including a rotary drum having an outer circumferential surface on which one band or two bands are wound with terminal ends being adapted to be tightened by a hydraulic actuator. Thus, the frictional coupling device serves to selectively provide a drive connection between two component parts between which each clutch or brake is interposed.

With the transmission mechanism 10 of such a structure, the differential portion 11, serving as the continuously variable transmission, and the automatic transmission portion 20 constitute a continuously variable transmission. Further, with the differential portion 11 controlled so as to provide a speed ratio kept at a fixed level, the differential portion 11 and the automatic transmission portion 20 can provide the same state as that of a step-variable transmission.

More particularly, the differential portion 11 functions as the continuously variable transmission and the automatic transmission portion 20, connected to the differential portion 11 in series, functions as the step-variable transmission. Thus, the rotational speed, input to the automatic transmission portion 20 placed for at least one gear position M, (hereinafter referred to as "input rotational speed of the automatic transmission portion 20"), i.e., the rotational speed of the power transmitting member 18 (hereinafter referred to as "transmitting-member rotational speed $N_{18}$") are caused to continuously vary, thereby enabling the gear position M to have a continuously variable speed range. Accordingly, the transmission mechanism 10 provides an overall speed ratio γT (=rotational speed $N_{IN}$ of the input shaft 14/rotational speed $N_{OUT}$ of the output shaft 22) in a continuously variable range. Thus, the continuously variable transmission is established in the transmission mechanism 10. The overall speed ratio γT of the transmission mechanism 10 is the total speed ratio γT of a whole of the automatic transmission portion 20 that is established based on the speed ratio γ0 of the differential portion 11 and the speed ratio γ of the automatic transmission portion 20.

For the respective gear positions such as, for instance, the 1st-speed to 4th-speed gear positions of the automatic transmission portion 20 and the reverse-drive gear position as indicated in the coupling operation table shown in FIG. 2, the transmitting-member rotational speed $N_{18}$ is continuously varied with each gear position being obtained in a continuously variable speed range. Accordingly, a continuously variable speed ratio is present between adjacent gear positions, enabling the whole of the transmission mechanism 10 to have the total speed ratio γT in a continuously variable range.

Further, the speed ratio γ0 of the differential portion 11 is controlled so as to lay at a fixed level and the clutch C and brake B are selectively coupled, thereby causing either one of the 1st-speed to 4th-speed gear positions or the reverse-drive gear position (reverse-drive shift position) to be selectively established. This allows the overall speed ratio γT, variable in a nearly equal ratio, of the transmission mechanism 10 to be obtained for each gear position. Thus, the transmission mechanism 10 can be established in the same state as that of the step-variable transmission.

If, for instance, the differential portion 11 is controlled so as to provide the speed ratio γ0 at a fixed value of "1", the transmission mechanism 10 provides the total speed ratio γT for each gear position of the 1st-speed to 4th-speed gear positions of the automatic transmission portion 20 and the reverse-drive gear position as indicated by the coupling operation table shown in FIG. 2. Further, if the automatic transmission portion 20 is controlled under the 4th-speed gear position so as to cause the differential portion 11 to have the speed ratio γ0 of approximately, for instance, "0.7" less than a value of "1", the automatic transmission portion 20 has the total speed ratio γT of approximately, for instance, "0.7" that is less than a value of the 4th-speed gear position.

Figure 3:
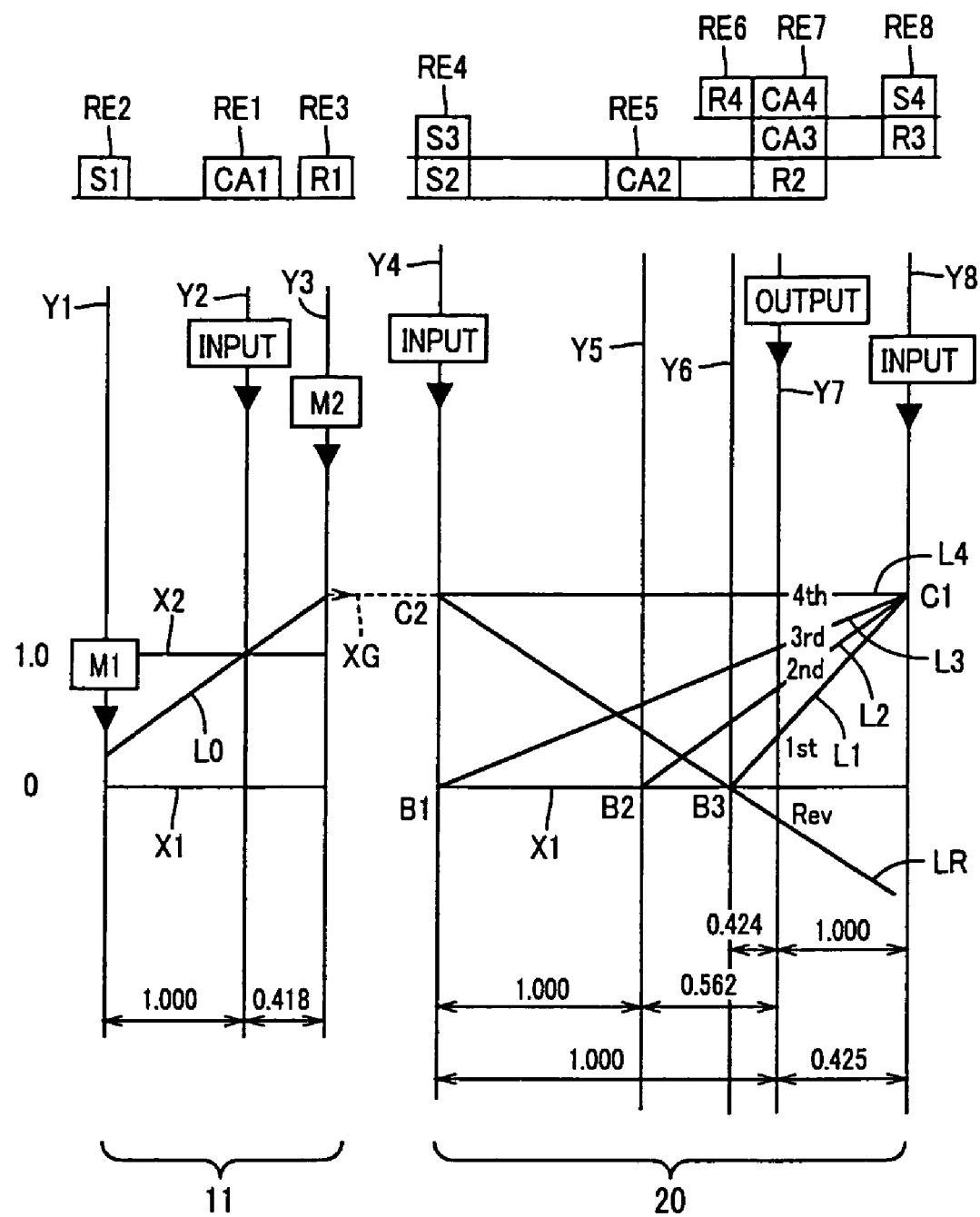
FIG. 3 is a collinear chart indicating mutually relative rotating speeds of rotary elements establishing various gear positions in the vehicular power transmitting apparatus shown in FIG. 1.

FIG. 3 is a collinear chart for the transmission mechanism 10, including the differential portion 11 and the automatic transmission portion 20, wherein the relative motion relationships among the rotational speeds of the various rotary elements in different coupling states for each gear position can be plotted on straight lines. The collinear chart of FIG. 3 takes the form of a two-dimensional coordinate system having the abscissa axis plotted with the gear ratios p of the planetary gear sets 24, 26, 28, 30 and the ordinate axis plotted with the mutually relative rotating speeds of the rotary elements. A transverse line X1 indicates the rotational speed that is zeroed; a transverse line X2 the rotational speed of "1.0", that is, the rotating speed $N_E$ of the engine 8 connected to the input shaft 14; and a transverse line XG the rotational speed of the power transmitting member 18.

Starting from the left, three vertical lines Y1, Y2 and Y3, associated with the three elements of the power distributing mechanism 16 forming the differential portion 11, represent the mutually relative rotating speeds of the first sun gear S1 corresponding to a second rotary element (second element) RE2, the first carrier CA1 corresponding to a first rotary element (first element) RE1, and the first ring gear R1 corresponding to a third rotary element (third element) RE3, respectively. A distance between the adjacent vertical lines is determined based on the gear ratio ρ1 of the first planetary gear set 24.

Starting from the left, further, five vertical lines Y4, Y5, Y6, Y7 and Y8 for the automatic transmission portion 20 represent the mutually relative rotating speeds of: the second and third sun gears S2, S3, connected to each other, which corresponds to a fourth rotary element (fourth element) RE4; the second carrier CA2 corresponding to a fifth rotary element (fifth element) RE5; the fourth ring gear R4a corresponding to a sixth rotary element (sixth element) RE6; the second ring gear R2, third carriers CA3 and fourth carriers CA4, connected to each other, which correspond to a seventh rotary element (seventh element) RE7; and the third ring gear R3 and fourth sun gear S4 connected to each other and corresponding to an eighth rotary element (eighth element) RE8, respectively. Each distance between the adjacent vertical lines is determined based on the gear ratios ρ2, ρ3 and ρ4 of the second, third and fourth planetary gear sets 26, 28, 30.

In the relationship among the vertical lines on the collinear chart, if a space between the sun gear and carrier is set to a distance corresponding to a value of "1", then, a space between the carrier and ring gear lies at a distance corresponding to the gear ratio p of the planetary gear set. That is, for the differential portion 11, a space between the vertical lines Y1 and Y2 is set to a distance corresponding to a value of "1" and a space between the vertical lines Y2 and Y3 is set to a distance corresponding to the gear ratio ρ1. For the automatic transmission portion 20, further, the space between the sun gear and carrier is set to the distance corresponding to the value of "1" for each of the second, third and fourth planetary gear sets 26, 28, 30, for which the space between the carrier and ring gear is set to the distance corresponding to the gear ratio ρ1.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is connected to the input shaft 14, i.e., the engine 8 and the second rotary element RE2 is connected to the first electric motor M1. The third rotary element RE3 (first ring gear R1) is connected to the power transmitting member 18 and the second electric motor M2. Thus, a rotary motion of the input shaft 14 is transmitted (input) to the automatic transmission portion 20 through the power transmitting member 18. A relationship between the rotational speeds of the first sun gear S1 and the first ring gear R1 is represented by an inclined straight line L0 which passes across a point of intersection between the lines Y2 and X2.

Now, description is made of a case in which, for example, the differential portion 11 is placed in a differential state with the first to third rotary elements RE1 to RE3 enabled to rotate relative to each other while the rotational speed of the first ring gear R1, indicated at an intersecting point between the straight line L0 and the vertical line Y1, is bound with the vehicle speed V and remains at a nearly constant level. In this case, as the engine speed $N_E$ is controlled with the rotational speed of the first carrier CA1, as represented by an intersecting point between the straight line L0 and the vertical line Y2, being raised or lowered, the rotational speed of the first sun gear S1, i.e., the rotational speed of the first electric motor M1, indicated by an intersecting pint between the straight line L0 and the vertical line Y1, is raised or lowered.

On controlling the rotational speed of the first electric motor M1 so as to allow the differential portion 11 to have the speed ratio γ0 of "1" with the first sun gear S1 rotating at the same speed as the engine speed $N_E$, the straight line L0 is aligned with the horizontal line X2. When this takes place, the first ring gear R1, i.e., the power transmitting member 18, is caused to rotate at the same speed as the engine speed $N_E$. On the contrary if the rotational speed of the first electric motor M1 is controlled so as to allow the differential portion 11 to have the speed ratio γ0 of a value less than "1", for instance, a value of approximately "0.7" with the rotational speed of the first sun gear S1 being zeroed, the power transmitting member 18 is caused to rotate at an increased transmitting-member rotational speed $N_{18}$ higher than the engine speed $N_E$.

With the automatic transmission portion 20, the fourth rotary element RE4 is selectively connected to the power transmitting member 18 via the second clutch C2 and selectively connected to the casing 12 via the first brake B1 with the fifth rotary element RE5 being selectively connected to the casing 12 via the second brake B2. The sixth rotary element RE6 is selectively connected to the casing 12 via the third brake B3 with the seventh rotary element RE7 connected to the output shaft 22, and the eighth rotary element RE8 is selectively connected to the power transmitting member 18 via the first clutch C1.

Next, description is made of a case wherein with the automatic transmission portion 20, the differential portion, 11 is placed in a state with the straight line L0 brought into coincidence with the horizontal line X2 to cause the differential portion 11 to transfer the vehicle drive force to the eighth rotary element RE8 at the same speed as the engine speed $N_E$ upon which the first clutch C1 and the third brake B3 are coupled as shown in FIG. 3. In this case, the rotational speed of the output shaft 22 for the 1st-speed gear position is represented by an intersecting point between the inclined line L1, passing across an intersecting point between the vertical line Y8, indicative of the rotational speed of the eighth rotary element RE8, and the horizontal line X2 and a point of intersection between the vertical line Y6, indicative of the rotational speed of the sixth rotary element RE6, and the horizontal line X1, and an intersecting point intersecting the vertical line Y7 indicative of the rotational speed of the seventh rotary element RE connected to the output shaft 22 as indicated in FIG. 3.

Similarly, the rotational speed of the output shaft 22 for the 2nd-speed gear position is represented by an intersecting point between an inclined straight line L2, determined when the first clutch C1 and second brake B2 are coupled, and the vertical line Y7 indicative of the rotational speed of the seventh rotary element RE7 connected to the output shaft 22. The rotational speed of the output shaft 22 for the 3rd-speed gear position is represented by an intersecting point between an inclined straight line L3, determined with the first clutch C1 and first brake B1 being coupled, and the vertical line Y7 indicative of the rotational speed of the seventh rotary element RE7 connected to the output shaft 22. The rotational speed of the output shaft 22 for the 4th-speed gear position is represented by an intersecting point between a horizontal straight line L4, determined with the first clutch C1 and second brake B2 being coupled, and the vertical line Y7 indicative of the rotational speed of the seventh rotary element RE7 connected to the output shaft 22.

Figure 4:
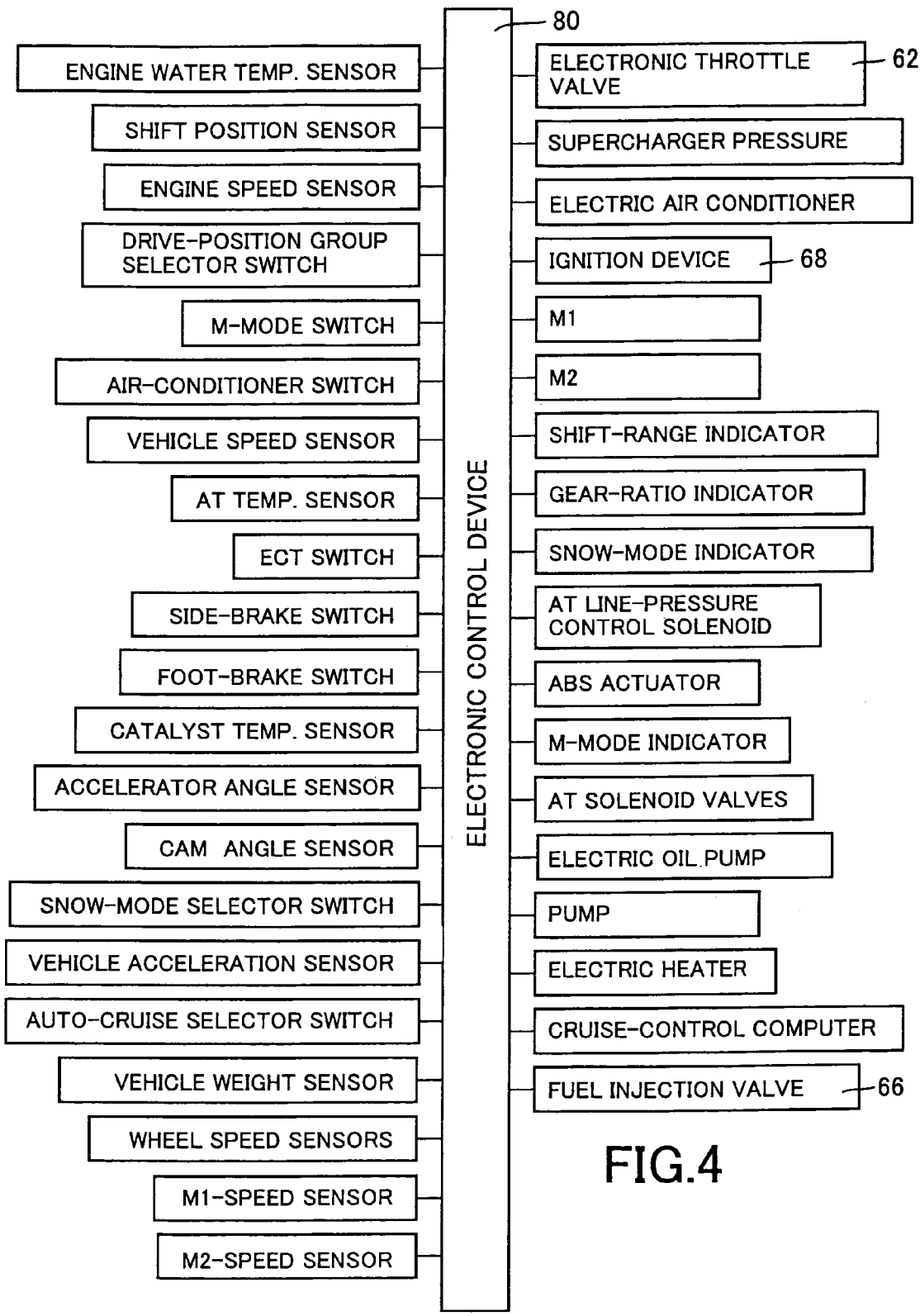
FIG. 4 is a view showing an electronic control unit with input and output signals associated therewith which is provided in the vehicular power transmitting apparatus shown in FIG. 1.

FIG. 4 shows an electronic control unit 80 operative to control the transmission mechanism 10 of the present invention for generating various output signals in response to various input signals. The electronic control unit 80 includes a so-called microcomputer incorporating a CPU, a ROM, a RAM and an input/output interface. It is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control unit 80, connected to various sensors and switches as shown in FIG. 4, receives various signals such as a signal indicative of an engine coolant temperature $TEMP_W$; a signal indicative of a shift position $P_{SH}$ selected with a shift lever 52 (shown in FIG. 7) and a signal indicative of the number of operations initiated on the "M" position; a signal indicative of the engine speed $N_E$ representing the rotational speed of the engine 8; a signal indicative of a gear train preset value; a signal commanding an M mode (manual shift running mode); a signal indicative of an operated state of an air conditioner; a signal indicative of the rotational speed (hereinafter referred to as "output shaft rotation speed") $N_{OUT}$ of the output shaft 22; a signal indicative of a temperature TOIL of working oil of the automatic transmission portion 20.

Figure 7:
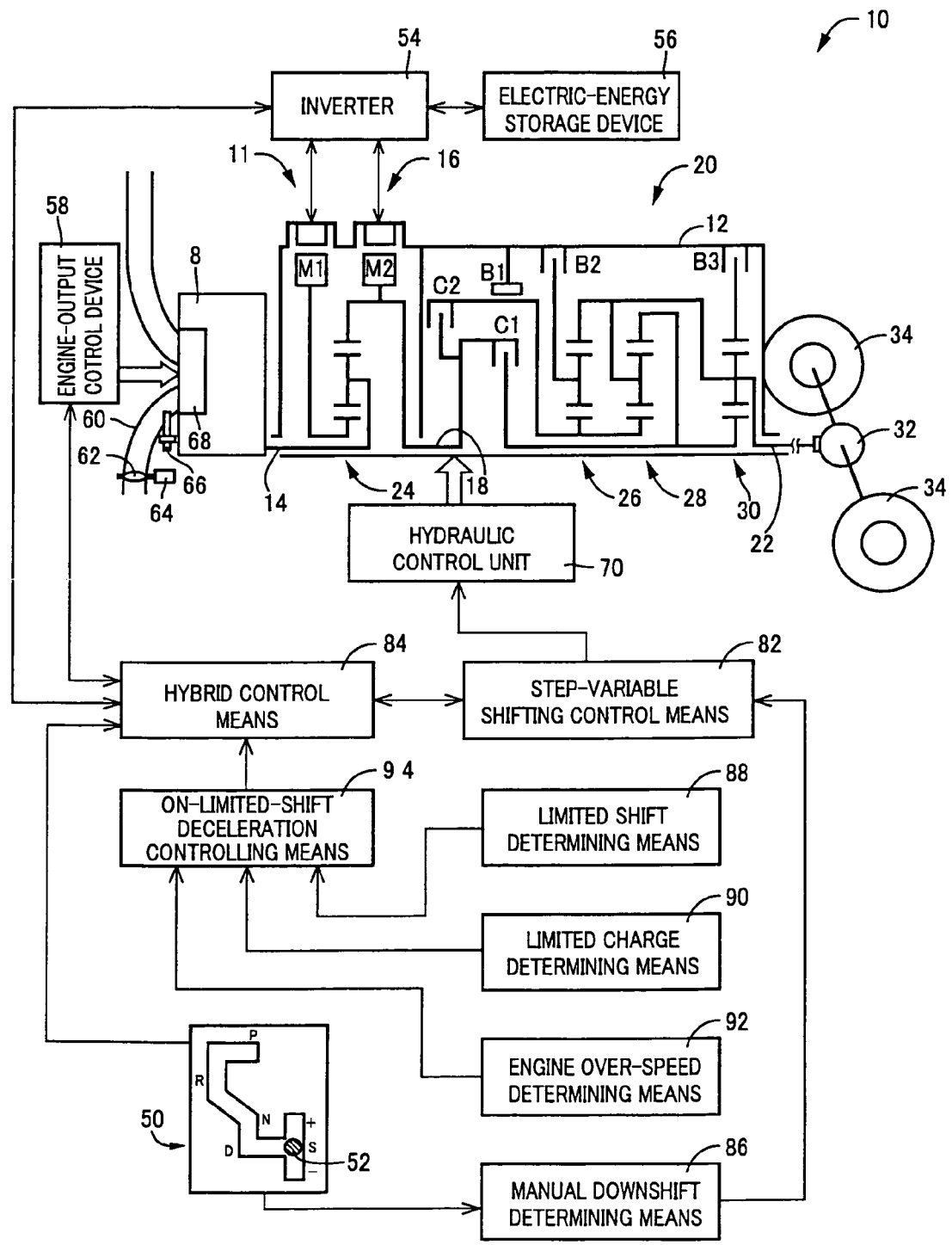
FIG. 7 is a functional block diagram illustrating major control functions of the electronic control unit of FIG. 4.

The electronic control unit 80 also receives a signal indicative of a side brake under operation; a signal indicative of a foot brake under operation; a signal indicative of a temperature of a catalyst; a signal indicative of an accelerator opening Acc representing an operating stroke of an accelerator pedal when manipulated by a driver for his output demand value; a signal indicative of a cam angle; a signal indicative of a snow mode under setting; a signal indicative of a fore and aft acceleration value G of the vehicle; a signal indicative of an auto-cruising drive mode; a signal indicative of a weight vehicle weight) of the vehicle; a signal indicative of a wheel velocity of each drive wheel; a signal indicative of a rotational speed $N_{M1}$ of the first electric motor M1 (hereinafter referred to as "first-electric motor speed $N_{M1}$"); a signal indicative of a rotational speed $N_{M2}$ of the second electric motor M2 (hereinafter referred to as "second-electric motor speed $N_{M2}$"); and a signal indicative of a state of charge SOC stored in an electric-energy storage device 60 (see FIG. 7).

The electronic control unit 80 generates various signals including: a control signal applied to an engine output control device 58 (see FIG. 7) for controlling an engine output, i.e., a drive signal applied to a throttle actuator 64 for controlling a throttle valve opening $\theta_{TH}$ of an electronic throttle valve 62 disposed in an intake manifold 60 of the engine 8; a fuel supply quantity signal applied to a fuel injecting device 66 for controlling an amount of fuel injected into the intake manifold 60 or cylinders of the engine 8; an ignition signal applied to an ignition device 68 to control the ignition timing of the engine 8; a supercharger pressure regulation signal for regulating a supercharger pressure of the engine 8; an electric air-conditioner drive signal for actuating an electric air conditioner; command signals for commanding the operations of the first and second electric motors M1 and M2; a shift-position (manipulated position) display signal for actuating a shift-range indicator; a gear-ratio indicating signal for displaying the gear ratio; a snow-mode display signal for displaying the presence of a snow-mode; and an ABS actuation signal for operating an ABS actuator to preclude slippages of the drive wheels during a braking phase.

The electronic control unit 80 also generates a M-mode display signal for displaying an M-mode being selected; valve command signals for actuating electromagnetic valves (linear solenoid valves), incorporated in the hydraulic control unit 70 (see FIGS. 5 and 7) for controlling the hydraulic actuators of the hydraulically operated frictional coupling devices of the differential portion 11 and automatic transmission portion 20; a signal for regulating a regulator valve (pressure regulator valve), incorporated in the hydraulic control unit 70, to regulate a line pressure $P_L$; a drive command signal for actuating an electric hydraulic pump acting as a hydraulic original-pressure source for the line pressure $P_L$ to be regulated; a signal for driving an electric heater; and a signal applied to a cruise-control computer.

Figure 5:
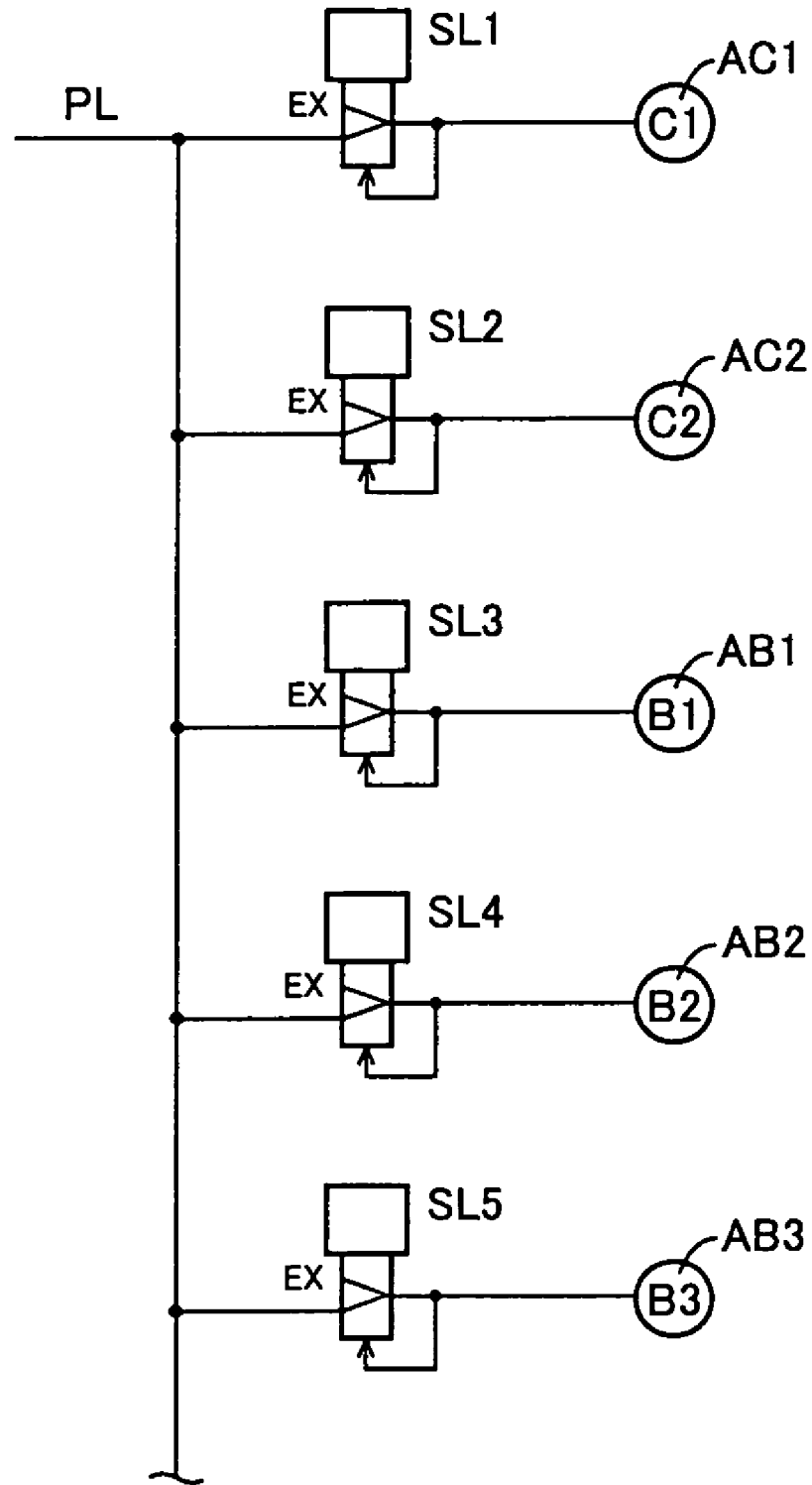
FIG. 5 is a circuit diagram showing a major portion of a hydraulic control circuit associated with linear solenoid valves arranged to control operations of respective hydraulic actuators of clutches C and brakes B.

FIG. 5 is a circuit diagram related to linear solenoid valves SL1 to SL5 of the hydraulic control circuit 70 for controlling the operations of respective hydraulic actuators (hydraulic cylinders) AC1, AC2, AB1, AB2, AB3 of the clutches C1, C2 and brakes B1 to B3.

As shown in FIG. 5, the hydraulic actuators AC1, AC2, AB1, AB2, AB3 are connected to the respective linear solenoid valves SL1-SL5, which are controlled in response to control commands, delivered from the electronic control unit 80. This adjusts the line pressure PL into respective clutch engaging pressures PC1, PC2, PB1, PB2 and PB3 to be applied directly to the respective hydraulic actuators AC1, AC2, AB1, AB2, AB3. The line pressure $P_L$ represents an original hydraulic pressure, generated by an electrically operated hydraulic oil pump (not shown) or a mechanical oil pump driven by the engine 30, which is regulated by a relief-type pressure regulator valve depending on a load of the engine 8 in terms of an accelerator opening displacement or a throttle valve opening.

The linear solenoid valves SL1 to SL5, fundamentally formed in the same structure, are independently energized or de-energized with the electronic control unit 80. This allows the hydraulic actuators AC1, AC2, AB1, AB2, AB3 to independently and controllably regulate hydraulic pressures, thereby controlling the clutch engaging pressures PC, PC2, PB1, PB2, PB3. With the automatic transmission portion 20, predetermined coupling devices are coupled in a pattern indicated on, for instance, the coupling-operation indicating table shown in FIG. 2, thereby establishing various gear positions. In addition, during the shifting control of the automatic transmission portion 20, a so-called clutch-to-clutch shifting is executed to simultaneously control the coupling or uncoupling of the clutches C and the brakes B relevant to the shifting operations.

Figure 6:
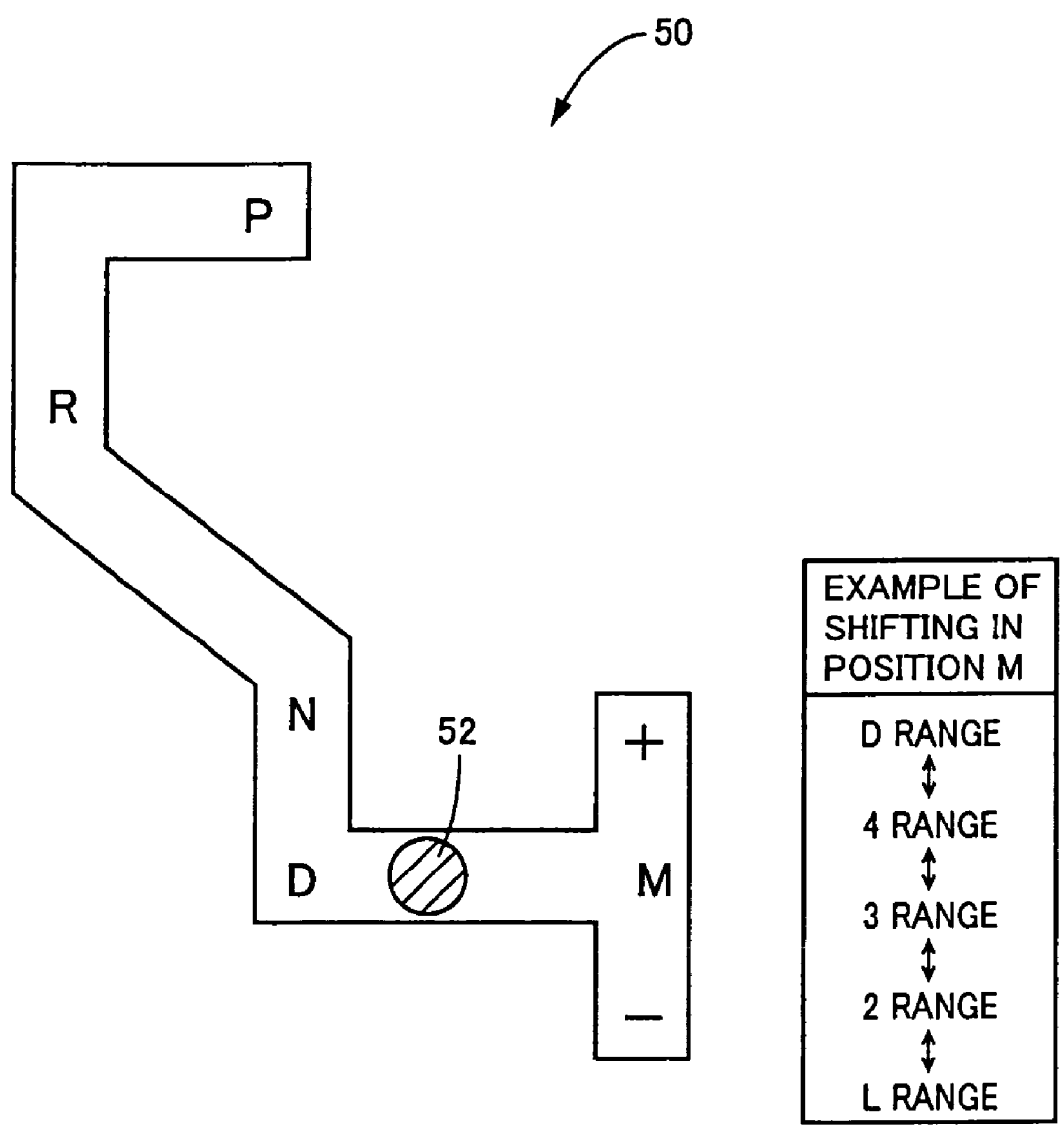
FIG. 6 is a view showing one example of a manually operated shifting device including a shift lever and operable to select one of a plurality of shift positions of multiple kinds.

FIG. 6 is a view showing one example of a manually operated shifting device 50 serving as a changeover device operative to shift multiple kinds of shift positions $P_{SH}$ on manual operation. The shifting device 50 is mounted in, for instance, an area lateral to a driver's seat and includes a shift lever 52 to be manipulated for selecting one of the plurality of shift positions $P_{SH}$.

The shift lever 52 has a parking position "P" (Parking) under which an inside of the transmission mechanism 10, i.e., the power transmitting path inside the automatic transmission portion 20 is shut off in a neutral condition, i.e., a neutral state with the output shaft 22 of the automatic transmission portion 20 remained in a locked state; a reverse drive position "R" (Reverse) for a reverse drive mode; a neutral position "N" (Neutral) for the power transmitting path of the transmission mechanism 10 to be shut off in the neutral state; an automatic forward-drive running position "D" (Drive); and a manual-shift forward-drive position "M" (Manual).

In the automatic forward-drive running position "D", an automatic shift mode is established for executing an automatic shift control within a varying range of a shiftable total speed ratio γT of the transmission mechanism 10 resulting from various gear positions whose automatic shift control is performed in a continuously variable speed ratio width of the differential portion 11 and a range of the 1st-speed to the 4th-speed gear positions of the automatic transmission portion 20. The manual-shift forward-drive position "M" is manually shifted to establish a manual-shift forward-drive mode (manual mode) for setting a so-called shift range to limit a shifting gear position on a high speed range during the operation of the automatic transmission portion 20 under the automatic shift control.

As the shift lever 52 is shifted to the various shift positions $P_{SH}$, the hydraulic control circuit 70 is electrically switched, thereby obtaining the reverse-drive "R" gear position, the neutral position "N" and the various gear shift positions or the like in the forward-drive gear position "D".

Among the various shift positions $P_{SH}$ represented in the "P" to "M" positions, the "P" and "N" positions represent non-running positions selected when no vehicle is caused to run. That is, the "P" and "N" positions represent non-drive positions selected when the first and second clutches C1, C2 select to cause the power transmitting path to be switched to a power cut-off state like a situation where as indicated in, for instance, the coupling operation indicating table shown in FIG. 2, both the first and second clutches C1, C2 are uncoupled o interrupt the power transmitting path inside the automatic transmission portion 20 so as to disenable the driving of the vehicle.

The "R", "D" and "M" positions represent running positions selected when the vehicle is caused to run. That is, these positions represent drive positions selected when the first and/or second clutches C1, C2 select to cause the power transmitting path to be switched to a power transmitting state like a situation where as indicated in, for instance, the coupling operation indicating table shown in FIG. 2, at least one of the first and second clutches C1, C2 is coupled to establish the power transmitting path inside the automatic transmission portion 20 so as to enable the vehicle to be driven.

More particularly, as the shift lever 52 is manually shifted from the "P" position or the "N" position to the "R" position, the second clutch C2 is coupled to cause the power transmitting path of the automatic transmission portion 20 to be switched from the power cut-off state to the power transmitting state. With the shift lever 52 manually shifted from the "N" position to the "D" position, at least the first clutch C1 is coupled to switch the power transmitting path of the automatic transmission portion 20 from the power cut-off state to the power transmitting state. With operation of the shift lever 52 to the "R" position, the second and third clutches C2 and C3 are engaged to establish the rearward running step.

Further, as the shift lever 52 is manually shifted from the "R" position to the "P" or "N" position, the second clutch C2 is uncoupled to switch the power transmitting path of the automatic transmission portion 20 from the power transmitting state to the power cut-off state. With the shift lever 52 manually shifted from the "D" position to the "N" position, the first clutch C1 or second clutch C2 is uncoupled to switch the power transmitting path of the automatic transmission portion 20 from the power transmitting state to the power cut-off state.

FIG. 7 is a functional block diagram illustrating major control functions to be executed by the electronic control unit 80. Step-variable shifting control means 82 determines whether to execute the shifting of the automatic transmission portion 20, i.e., the gear position to be shifted for causing the automatic transmission portion to execute the automatic shift control, based on the vehicle condition, represented by an actual vehicle speed V and the output torque $T_{OUT}$ by referring to the relationships (shifting lines and shifting map) involving upshift lines (in solid lines) and downshift lines (in single dot lines) shown in FIG. 8 that are preliminarily stored as parameters of the vehicle speed V and the demanded output torque $T_{OUT}$.

Figure 8:
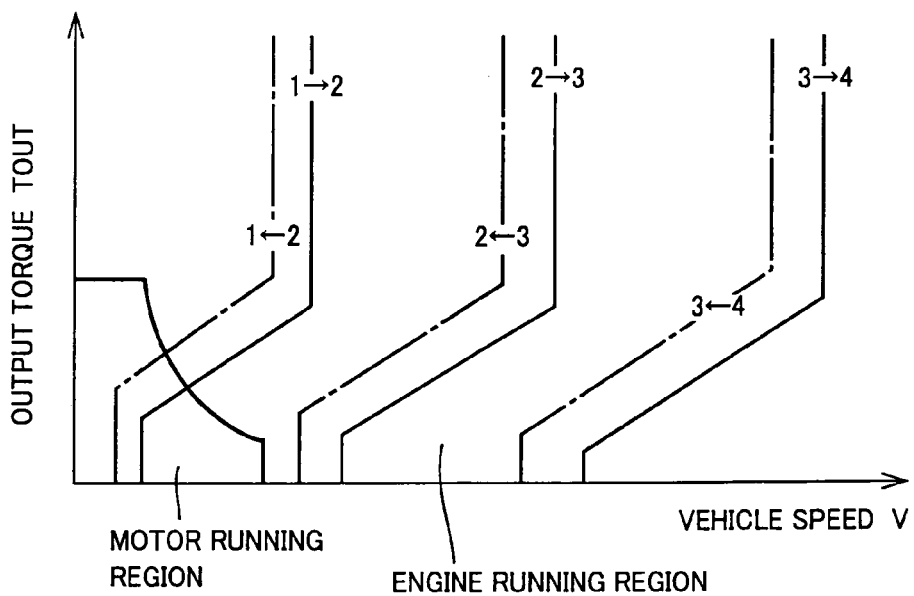
FIG. 8 is a view illustrating one example of a shifting map for use in performing a shifting control of the power transmitting apparatus shown in FIG. 1, and one example of drive-power-source map defining boundary lines for use in a drive-power-source switching control between an engine-drive mode and a motor-drive mode with those maps being related to each other.

Upon determination of the gear position i.e. shift position to be shifted with FIG. 8, the step-variable shifting control means 82 outputs commands (a shift output command and a hydraulic pressure command) to the hydraulic control circuit 70 for coupling and/or uncoupling the hydraulically operated frictional coupling devices, involved in the shifting of the automatic transmission portion 20 so as to establish the gear position in accordance with the coupling table shown in FIG.

2. That is, the step-variable shifting control means 82 outputs a command to the hydraulic control circuit 70 for uncoupling the on-uncoupling side coupling device, involved, while coupling the on-coupling side coupling device in the shifting to cause the clutch-to-clutch shifting to be executed. Upon receipt of such commands, the hydraulic control circuit 70 causes the linear solenoid valves SL of the automatic transmission portion 20 to be actuated. This allows the hydraulically operated actuators of the hydraulically operated frictional coupling devices, involved in the relevant shifting, to be actuated. Thus, for instance, the on-uncoupling side coupling device is uncoupled and the on-coupling side coupling device is coupled, causing the automatic transmission portion 20 to execute the shifting.

The step-variable shift controlling means 82 operates in a manner described below with the shift lever 52 shifted in a manual shift mode to be placed in an "M" position representing a forward-drive manual shift running position. That is, the step-variable shift controlling means 82 operates, in response to the operation of the shift lever 52 placed in a "+" position or a "−" position, to set a high-speed-side gear position to any one of sequentially limited automatic shifting ranges to establish an engine braking condition. In an alternative, the step-variable shift controlling means 82 allows one of a plurality of gear positions to be directly determined to establish the engine braking condition. Such an engine braking condition, placed under the manual shift mode, is not mechanically effectuated in the present embodiment, but electrically realized with hybrid control means 84, described later, in the same manner as that effectuated in the coast running mode.

Hybrid control means 84 operates the engine 8 in an optimum operating range at a high efficiency while distributing the drive forces of the engine 8 and the second electric motor M2 at optimum rates and optimally varying a reacting force of the first electric motor M1 during the operation thereof to generate electric power, thereby controllably operating the differential portion 11 under an electrically controlled continuously variable transmission to control a speed ratio γ0. At a vehicle speed V during the running of the vehicle in one occasion, for instance, a target (demanded) output for the vehicle is calculated based on the accelerator opening Acc and the vehicle speed V both of which represent output demanded variables of the driver, after which a demanded total target output is calculated based on the target output of the vehicle and a battery charge demanded value.

Subsequently, a target engine output is calculated in consideration of a loss in power transmission, loads of auxiliary units, assist torque of the second electric motor M2 or the like so as to obtain the total target output. Then, the hybrid control means 84 controls the engine 8, while controlling a rate of electric power being generated by the first electric motor M1, so as to obtain the engine speed $N_E$ and engine torque $T_E$ such that the target engine output is obtained.

The hybrid control means 84 executes such controls in consideration of, for instance, the gear position of the automatic transmission portion 20 with a view to increasing a dynamic performance and improving fuel consumption. During such hybrid controls, the differential portion 11 is caused to operate as the electrically controlled continuously variable transmission such that the engine speed $N_E$ and the vehicle speed V, determined for the engine 8 to operate in the operating range at a high efficiency, match the vehicle speed and the rotational speed of the power transmitting member 18 determined with the gear position in the automatic transmission portion 20.

Figure 9:
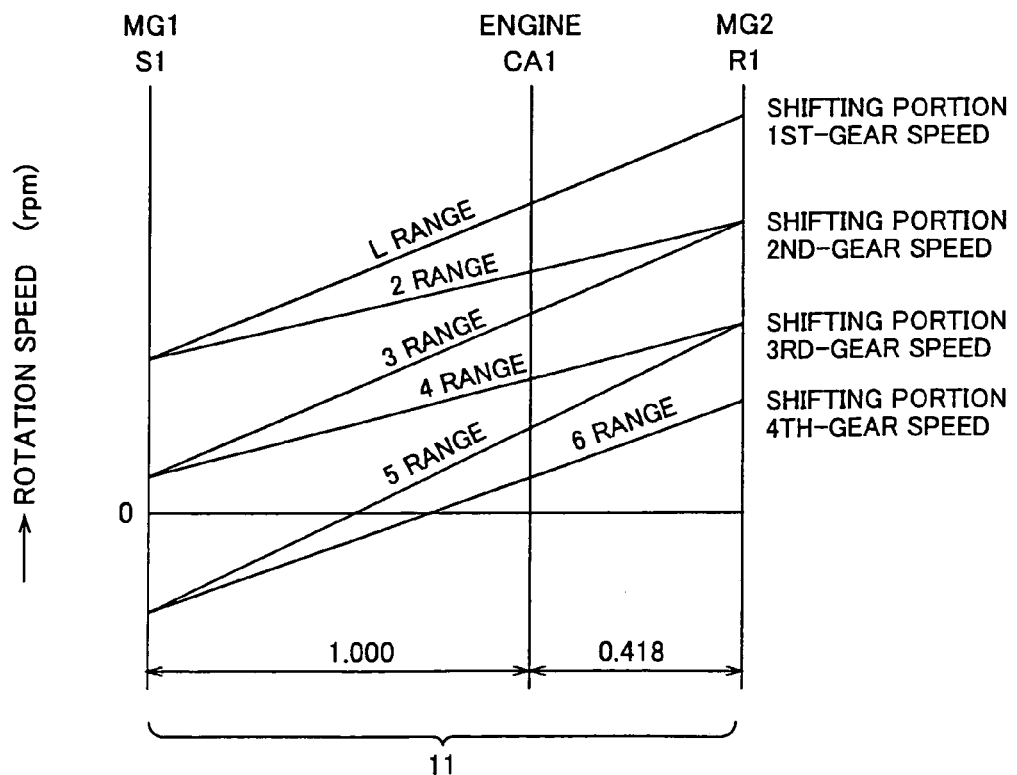
FIG. 9 is a collinear chart for illustrating a differential action initiated during a normal manual downshift request deceleration control executed by the electronic control device.

That is, the hybrid control means 84 determines a target value of the total speed ratio γT of the transmission mechanism 10 such that the engine 8 is caused to operate along an optimal fuel efficiency curve (a fuel efficiency map and the relationships) of the engine 8 as indicated by a dotted line in FIG. 9 which is preliminarily and experimentally obtained and prestored. This achieves a compromise between driveability and fuel consumption during the running of the vehicle under a continuously variable shifting mode on a two-dimensional coordinate established with the engine speed $N_E$ and output torque (engine torque) $T_E$ of the engine 8. For instance, the target value of the total speed ratio γT of the transmission mechanism 10 is determined so as to obtain engine torque $T_E$ and the engine speed $N_E$ for generating the engine output demanded for satisfying target outputs (a total target output and demanded drive torque). Then, the speed ratio γ0 of the differential portion 11 is controlled in consideration of the gear position in the automatic transmission portion 20 so as to obtain the relevant target value, thereby controlling the total speed ratio γT within a continuously variable shifting range.

When this takes place, the hybrid control means 84 allows electric energy, generated by the first electric motor M1, to be supplied through an inverter 54 to a battery device 56 and the second electric motor M2. Thus, a major part of drive power of the engine 8 is mechanically transferred to the power transmitting member 18. However, a part of drive power of the engine 8 is consumed with the first electric motor M1 for the generation of electric power and converted into electric energy. Resulting electric energy is supplied through the inverter 54 into the second electric motor M2, which is consequently driven. Therefore, the part of drive power is transferred through the second electric motor M2 to the power transmitting member 18. Equipment, involved in the operations starting from the step of generating electric power to the step of causing the second electric motor M2 to consume resultant electric energy, establishes an electric path in which the part of the drive power of the engine 8 is converted into electric energy and resultant electric energy is converted into mechanical energy.

The hybrid control means 84 allows the differential portion 11 to perform an electrically controlled CVT function for controlling, for instance, a first-electric-motor rotational speed $N_{M1}$ and/or a second-electric-motor rotational speed $N_{M2}$ to maintain the engine speed $N_E$ at a nearly constant level or to control the rotational speed at an arbitrary level, regardless of the vehicle remaining under a halted condition or a running condition. In other words, the hybrid control means 84 controls the first-electric-motor rotational speed $N_{M1}$ and/or a second-electric-motor rotational speed $N_{M2}$ at an arbitrary level while maintaining the engine speed $N_E$ at the nearly constant level or the arbitrary rotational speed.

As will be apparent from the collinear chart shown in FIG. 3, for instance, when raising the engine speed $N_E$ during the running of the vehicle, the hybrid control means 84 raises the first-electric-motor rotational speed $N_{M1}$ while maintaining a second-electric-motor rotational speed $N_{M2}$ at a nearly fixed level that is bound with the vehicle speed V (represented by the drive wheels 34). In addition, when maintaining the engine speed $N_E$ at the nearly fixed level during the shifting of the automatic transmission portion 20, the hybrid control means 84 varies the first-electric-motor rotational speed $N_{M1}$ in a direction opposite to that in which the second-electric-motor rotational speed $N_{M2}$ varies with the shifting of the automatic transmission portion 20 while maintaining the engine speed $N_E$ at the nearly fixed level.

The hybrid control means 84 causes the throttle actuator 64 to controllably open or close the electronic throttle valve 62 for performing a throttle control. In addition, the hybrid control means 84 functionally includes engine output control means that outputs commands to an engine output control device 58 singly or in combination. This causes a fuel injection device 66 to control a fuel injection quantity and a fuel injection timing for fuel injection control while causing an ignition device 68 to control an ignition timing of an ignition device 68 such as an igniter or the like for an ignition timing control. Upon receipt of such commands, the engine output control device 58 executes an output control of the engine 8 so as to provide a demanded engine output.

For instance, the hybrid control means 84 basically drives the throttle actuator 60 in response to the accelerator opening Acc by referring to the prestored relationship (not shown) The throttle control is execited such that the greater the accelerator opening Acc, the larger will be the throttle valve opening $\theta_{TH}$. Upon receipt of the commands from the hybrid control means 84, further, the engine output control device 58 allows the throttle actuator 64 to controllably open or close the electronic throttle valve 62 for throttle control while controlling the ignition timing of the ignition device 68 such as the igniter or the like for ignition timing control, thereby executing an engine torque control.

Further, the hybrid control means 84 allows the differential portion 11 to perform an electrically controlled CVT (differential action) to establish the motor-drive mode regardless of a halt or idling state of the engine 8. For instance, the hybrid control means 84 executes the motor-drive mode under a relatively low output torque $T_{OUT}$ region, i.e., a low engine torque region wherein engine efficiency is generally regarded to be lower than that of a high-torque region, or a relatively low vehicle-speed region of the vehicle speed V, i.e., a low load region.

Further, for the purpose of suppressing a drag of the halted engine 8 to provide improved fuel consumption during the motor-drive mode, the hybrid control means 84 controls a first-motor rotation speed $N_{M1}$ in a negative rotation speed to place the first electric motor M1 under an unloaded condition for idling operation. This allows the differential portion 11 to perform the electrically controlled CVT (differential action), thereby maintaining the engine rotation speed $N_E$ at a zeroed or nearly zeroed level depending on needs.

Even if the engine-drive running region is present, the hybrid control means 84 allows the first electric motor M1 and/or the battery device 56 to supply electric energy to the second electric motor M2 using the electrical path mentioned above. This drives the second electric motor M2 to apply torque to the drive wheels 34, making it possible to provide a so-called torque-assist for assisting drive power of the engine 8.

The hybrid control means 84 renders the first electric motor M1 operative under the unloaded condition to freely rotate in the idling state. This makes it possible to cause the differential portion 11 to interrupt a torque transfer; i.e., the differential portion 11 is rendered inoperative with no output being provided under the same state as that in which the power transmitting path is disconnected in the differential portion 11. That is, the hybrid control means 84 places the first electric motor M1 in the unloaded condition, making it possible to place the differential portion 11 in a neutral condition (neutral state) in which the power transmitting path is electrically disconnected.

Further, the hybrid control means 84 has a function to serve as regeneration controlling means for charging electric energy to the battery 56 with a view to improving fuel consumption during a free-wheeling running state (coast running state) with an accelerator pedal being released, and a braking state with a foot brake being depressed in operation. That is, kinetic energy of the vehicle, i.e., a reversed drive force delivered from the drive wheels 38 to the engine 8 drivably rotates the second electric motor M2 that serves as an electric power generator for generating such electric energy. Such electric energy, i.e., a second-motor power-generation current is charged to the battery 56 via the inverter 54. This regenerative control is executed to achieve the amount of regeneration determined based on the charged sate (SOC) and the brake force distribution rate of the brake force resulting from the hydraulic brake for obtaining the brake force depending on the displacement of the accelerator pedal under depression.

Furthermore, when manual downshift determining means 86 determines during a non-accelerating running condition like the coast running state or the braking condition a request on a manual downshift, the hybrid control means 84 controls the first and second electric motors M1 and M2 in a manner as described below. That is, if the determination is made in response to the operation of the shift lever 52 being placed in the "–" position representing the presence of the request on the manual downshift by referring to the current range to another range lower by one gear position, the hybrid control means 84 controls the first and second electric motors M1 and M2 so as to generate a deceleration in line with the downshift.

FIG. 9 is a collinear chart for illustrating how the differential portion 11 operates when the shift range is manually selected. For instance, if the shift lever 52 is manually shifted from a range "6" to a range "5", the step-variable shift controlling means 82 initiates a downshift from a 4th-speed gear position to a 3rd-speed gear position while simultaneously controlling the rotation of the first electric motor M1 so as to maintain the relationship plotted on a line of the range "6" shown in FIG. 9. This results in an increase in the engine rotation speed $N_E$, thereby generating the deceleration (with an engine-brake force) corresponding to the "5" range.

If the shift lever 52 is manually shifted from the range "5" to the range "4", the step-variable shift controlling means 82 allows the 3rd-speed gear position to be sustained while simultaneously raising the rotation speed of the first electric motor M1 so as to maintain the relationship plotted on a line of the range "4" shown in FIG. 9. This results in an increase in the engine rotation speed $N_E$. That is, this causes the differential portion 11 to increase the speed ratio γ0. This raises the engine rotation speed $N_E$, thereby generating the deceleration (with an engine-braking force) corresponding to the range "4".

Even if the shift lever 52 is manually shifted from the range "4" to the range "3", from the range "3" to the range "2" and from the range "2" to the range "1", the step-variable shift controlling means 82 similarly performs respective operations, thereby obtaining decelerations depending on a range that is manually selected. Such a control represents a normal control initiated for the request on the manual downshift, and the hybrid control means 84 functions as manual-downshift-request deceleration control means.

Limited shift determining means 88 determines based on a failure (breakdown or defect) occurring in the linear solenoid valve incorporated in the hydraulic control circuit 70, whether or not the automatic shifting portion 20 intended to realize the deceleration required by the driver remains in a state disabling the change in the gear position. In addition, limited charge determining means 90 determines the operation based on whether or not the charged sate SOC reaches a predetermined upper limit, whether or not the battery 56 is available to be charged.

If the determination is made that the change in the gear position remains in the disabled state and a downshift is initiated for the gear position of the automatic shifting portion 20 for realizing the deceleration required by the driver, engine excessive rotation i.e. overspeed-rotation determining means 92 operates in a manner as described below. That is, the engine overspeed-rotation determining means 92 determines based on the current engine rotation speed $N_E$ whether or not the engine 8 encounters an overspeed rotation state exceeding a predetermined upper limit level such as, for instance, 6000 rpm, in the presence of an attempt to increase the engine rotation speed $N_E$ by raising the rotation speed of the first electric motor M1 based on the downshift.

If the manual downshift determining means 86 determines during a non-accelerating running state with the accelerator-opening Acc or the throttle opening $\theta_{TH}$ being zeroed a request on the manual downshift, on-limited-shift deceleration controlling means 94 operates in a manner described below. That is, upon request on the manual downshift, the limited shift determining means 88 determines that the automatic shifting portion 20 remains in the state disabling the change in the gear position. However, if the limited charge determining means 90 determines that the battery 56 still remains in a charge enabling state, the on-limited-shift deceleration controlling means 94 operates to realize the deceleration required by the driver.

More particularly, in order to realize a given rate of deceleration, the second electric motor M2 is caused to perform the regeneration in place of initiating the downshift in the gear position of the automatic shifting portion 20. Simultaneously, increasing the rotation speed of the first electric motor M1 causes the engine rotation speed $N_E$ to increase, thereby generating the deceleration at a rate corresponding to the range manually selected by the driver.

In contrast, if the limited charge determining means 90 determines that the battery 56 still remains in a charge disabling state, then, the on-limited-shift deceleration controlling means 94 solely operates to increase the rotation speed of the first electric motor M1 to a higher level than that achieved when the battery remains in the charge enabling state, causing a further increase in the engine rotation speed $N_E$. This ensures the deceleration to be generated in line with the range manually selected by the driver.

Further, if the engine overspeed-rotation determining means 92 determines that the engine 8 will enter the overspeed rotation state, then, the on-limited-shift deceleration controlling means 94 solely operates to cause the second electric motor M2 to perform the regeneration at a greater rate than that achieved when the engine rotation speed is available to increase. This ensures the deceleration to be generated at a rate corresponding to the range manually selected by the driver. That is, when the automatic shifting portion 20 remains in the state disabling the change in gear position, the rotation speed of the first electric motor M1 is raised to alter the differential state of the electrically controlled differential portion 11, thereby obtaining a variation in drive force at a rate corresponding to the operation of the shift lever 52 manually shifted by the driver.

Figure 10:
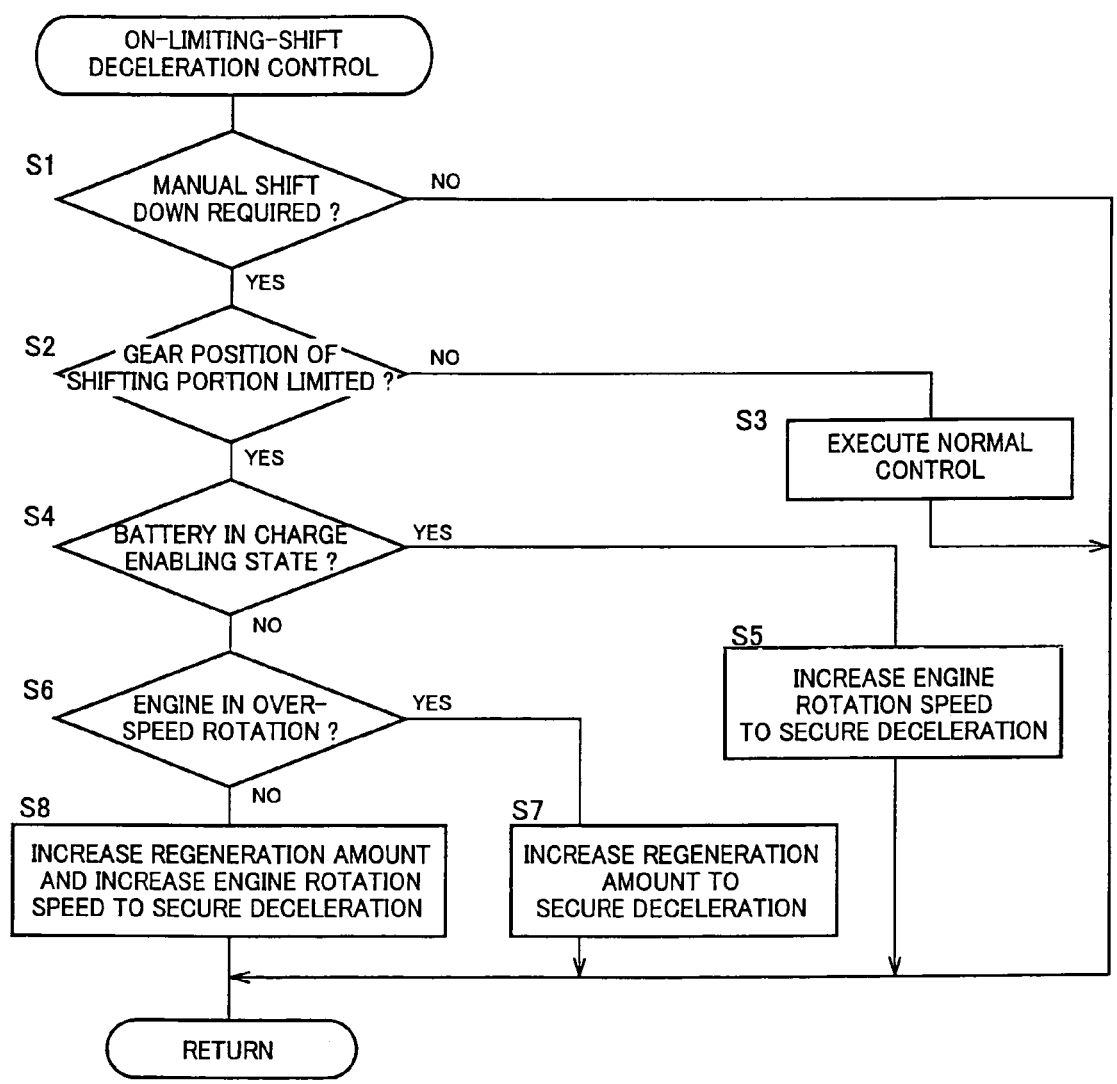
FIG. 10 is a flowchart illustrating a basic sequence of control operations to be executed by the electronic control unit shown in FIG. 4, i.e., a basic sequence of control operations to be executed when performing a deceleration control during a restricted shifting state.

FIG. 10 is a flowchart for illustrating a basic sequence of control operations to be executed by the electronic control unit 80. It illustrates a basic sequence of on-limited-shift deceleration controlling operations to be executed during the non-accelerating running state with the accelerator-opening Acc or the throttle opening $\theta_{TH}$ being zeroed. This sequence is repeatedly executed on an extremely short cycle time of, for instance, several milliseconds or several tens milliseconds.

First, step (hereinafter the term "step" is omitted) S1 corresponding to the manual downshift determining means 86 determines presence/absence of a request on a manual downshift from the current range to another range lower by one gear position during the coast running (free-wheeling running) state with the accelerator pedal being released. This determination is made based on a fact that the shift lever 52 is shifted to the "−" position. If a negative determination is made in S1, then, the current routine is terminated.

If a positive determination is made in S1, then, S2 corresponding to the limited shift determining means 88 determines whether or not the automatic shifting portion 20 remains in the state disabling the change in the gear position for realizing the deceleration required by the driver. This determination is made based on the occurrence of the failure (breakdown or defect) caused in the linear solenoid valve SL incorporated in the hydraulic control circuit 70. If the determination is made positive in S2, then, S3 corresponding to on-manual-downshift-request deceleration controlling means (hybrid control means 84) executes a normal on-manual-downshift-request deceleration control. More particularly, the control is performed so as to switch the gear position of the step-variable shifting portion 22 while increasing the rotation speed of the first electric motor M1 for obtaining the deceleration at a rate corresponding to the range manually selected by the driver.

If the determination is made negative in S2, then, S4 corresponding to the limited charge determining means 90 determines based on the charged sate SOC whether or not the battery still remains in the charge enabling state. That is, it determines whether or not the second electric motor M2 is available to generate electric power. If the determination is made positive in S4, then, SA5 corresponding to the on-limited-shift deceleration controlling means 94 solely raises the rotation speed of the first electric motor M1 to a level higher than that in which the charging is available, thereby providing a further increase in engine rotation speed $N_E$ so as to realize the deceleration required by the driver. This ensures the deceleration to be generated at a rate corresponding to the range manually selected by the driver.

However, if the determination is made negative in S4, then, S6 corresponding to the engine overspeed-rotation determining means 92 determines whether or not the engine 8 will enter the overspeed rotating state. This is determined in the presence of an attempt to increase the engine rotation speed $N_E$ by raising the rotation speed of the first electric motor M1, in place of initiating the downshift for the gear position in the automatic shifting portion 20. If the determination is made positive in S6, then, S7 corresponding to the on-limited-shift deceleration controlling means 94 solely realizes the deceleration required by the driver. To this end, the second electric motor M2 is caused to perform the regeneration at a greater rate than that achieved when the engine rotation speed is available to increase. This ensures the deceleration to be generated at the rate corresponding to the range manually selected by the driver.

However, if the determination is made negative in S6, then, S8 corresponding to the on-limited-shift deceleration controlling means 94 causes the second electric motor M2 to perform the regeneration, in place of initiating the downshift for the gear position in the automatic shifting portion 20, with a view to realizing the deceleration required by the driver. Simultaneously, the first electric motor M1 increases in rotation speed with an increase in engine rotation speed $N_E$, thereby generating the deceleration at the rate corresponding to the range manually selected by the driver.

That is, when the automatic shifting portion 20 remains in the state disabling the change in the gear position, the rotation speed of the first electric motor M1 is raised, i.e., the engine rotation speed $N_E$ increases or the second electric motor M2 performs the regeneration, thereby altering the differential state of the electrically controlled differential portion 11. This makes it possible to obtain a variation in drive force depending on the manual shift operation of the shift lever 52 manipulated by the driver.

As set forth above, the electronic control device 80 of the shifting mechanism (vehicular power transmitting apparatus) 10 of the present embodiment, controls the differential state of the electrically controlled differential portion 11, if the driver performs the manual shift operation using the shift lever 52, i.e., when a shifting command is applied to the automatic shifting portion 20 remaining under the limited shifting state. This allows a variation to occur in the drive force in response to the shifting command, thereby appropriately preventing the occurrence of degradation in operability of the vehicle.

Further, the electronic control device 80 of the shifting mechanism 10 of the present embodiment issues the shifting command in response to the manual shift operation of the shift lever 52 effectuated by the driver. This allows a variation to occur in the drive force in synchronism with the shift operation of the driver, thereby appropriately preventing the occurrence of degradation in operability of the vehicle.

Still further, the electronic control device 80 of the shifting mechanism 10 of the present embodiment controls the differential state of the electrically controlled differential portion 11 upon changing the number of rotations of the engine (internal combustion engine) 8. Thus, changing the number of rotations of the engine 8 results in a variation in drive force in response to the shifting command.

Moreover, the electronic control device 80 of the shifting mechanism 10 of the present embodiment controls the differential state of the electrically controlled differential portion 11 upon changing the power generating state of the second electric motor M2. Thus, changing the rotating state of the first electric motor M1 or the power generating state of the second electric motor M2 result in a variation in drive force in response to the shifting command.

In addition, the electronic control device 80 of the shifting mechanism 10 of the present embodiment controls the differential state of the differential portion 11 by altering the rotation speed $N_E$ of the engine 8 and altering the power generating state or the rotating state of the second electric motor M2 depending on the charged sate of the battery 56. Therefore, selectively varying the rotation speed $N_E$ of the engine 8 and varying the power generating state of the second electric motor M2 result in the occurrence of a variation in drive force in response to the shifting command regardless of the charged sate of the battery 56.

Further, the electronic control device 80 of the shifting mechanism 10 of the present embodiment controls the differential state of the electrically controlled differential portion 11 upon selectively altering the rotation speed $N_E$ of the engine 8 and altering the power generating state of the first electric motor M1 or the second electric motor M2, depending on the state of the engine 8. Therefore, selectively altering the rotation speed $N_E$ of the engine 8 or altering the power generating state of the second electric motor M2 result in the occurrence of a variation in drive force in response to the shifting command, regardless of the power generating state of the second electric motor M2.

With the shifting mechanism 10 of the present embodiment, the automatic shifting portion 20 includes a mechanical type transmission that varies a speed ratio with varying a power transmitting point of torque. Therefore, rendering the electrically controlled differential portion 11 to operate as a continuously variable transmission by the electronic control device 80, allows a whole of the shifting mechanism (vehicular power transmitting apparatus) 10 to have a drive force that continuously varies with infinitely varying the speed ratio.

The electronic control device 80 of the shifting mechanism 10 of the present embodiment renders the electrically controlled differential portion 11 operative to serve as the continuously variable transmission with controlling the operating state of the first electric motor M1 or the second electric motor M2. Thus, drive torque is smoothly varied. In addition, the electrically controlled differential portion 11 can have not only a function to operate as an electrically controlled continuously variable transmission but also a function to operate as a step-variable transmission with varying the speed ratio step-by-step.

In the foregoing, the present invention, having been described with reference to the various embodiments shown in the drawings, may be implemented in various other modification or alternatives. For instance, although the previous embodiment has been described above with reference to the downshift being initiated through the manual operation, the present invention may be applied to an embodiment in which an upshift is initiated through a manual operation. Even in such embodiment, the vehicle can have a varying drive force even if the automatic shifting portion 20 executes the shifting in a limited state.

Instead for the second electric motor M2 directly connected to the transmitting member 18 in the illustrated embodiments, the second electric motor M2 may be connected to the power transmitting path extended from the engine 8 or the transmitting member 18 to the drive wheel 38, directly or indirectly via the transmission, or the like.

In the illustrated embodiment set forth above, while the differential portion 11 (power distributing mechanism 16) is configured to function as the electrically controlled continuously variable transmission in which the speed ratio $\gamma 0$ is continuously varied from the minimal value $\gamma 0_{min}$ the maximal value $\gamma 0_{max}$ the present invention may be applied even to a case wherein the speed ratio $\gamma 0$ of the differential portion 11 is not continuously varied but pretended to vary step-by-step with the use of a differential action.

With the power distribution mechanisms 16 of the illustrated embodiments, the first carrier CA1 is connected to the engine 8; the first sun gear S1 is connected to the first electric motor M1; and the first ring gear R1 is connected to the power transmitting member 18. However, the present invention is not necessarily limited to such connecting arrangement, and the engine 8, first electric motor M1 and power transmitting member 18 have no objection to be connected to either one of the three elements CA1, S1 and R1 of the first planetary gear set 24.

Although the illustrated embodiment has been described with reference to the engine 8 directly connected to the input shaft 14, these component parts may suffice to be operatively connected via, for instance, gears, belts or the like. No need may arise for the engine 8 and the input shaft 14 to be necessarily disposed on a common axis. The engine 8 may be, in addition to the internal combustion engine, an external combustion engine or other type drive force generating mechanism.

Further, while the illustrated embodiment has been described with reference to the first electric motor M1 and the second electric motor M2 wherein the first electric motor M1 is coaxially disposed with the drive apparatus input shaft 14 and connected to the first sun gear S1 upon which the second electric motor M2 is connected to the power transmitting member 18. However, no need arises for these component parts to be necessarily placed in such connecting arrangement. For example, the first electric motor M1 may be connected to the first sun gear S 1 through gears, a belt or the like, and the second electric motor M2 may be connected to the power transmitting member 18.

Instead for the automatic shifting portion 20 comprised of the planetary gear type step variable transmission in the illustrated embodiments, the automatic shifting portion 20 may be a constantly engaged parallel shaft type transmission, a belt type continuously variable transmission, or the like. In summary, any mechanical transmission of which shifting ratio changes as change of the torque transmitting path.

In the illustrated embodiment, further, the hydraulically operated frictional coupling devices such as the first and second clutches C1, C2 may include magnetic type clutches such as powder (magnetic powder) clutches, electromagnetic clutches and meshing type dog clutches, and electromagnetic type and mechanical coupling devices. For instance, with the electromagnetic clutches being employed, the hydraulic control circuit 70 may not include a valve device for switching hydraulic passages and may be replaced with a switching device or electromagnetically operated switching device or the like that are operative to switch electrical command signal circuits for electromagnetic clutches.

While the illustrated embodiment has been described above with reference to the automatic transmission portion 20 that is connected to the differential portion 11 in series via the power transmitting member 18, a countershaft may be provided in parallel to the input shaft 14 to allow the automatic transmission portion 20 to be coaxially disposed on an axis of the countershaft. In this case, the differential portion 11 and the automatic transmission portion 20 may be connected to each other in power transmitting capability via a set of transmitting members structured of, for instance, a counter-gear pair acting as the power transmitting member 18, a sprocket and a chain.

Further, the power distributing mechanism 16 of the illustrated embodiment may include, for instance, a differential gear set in which a pinion, rotatably driven with the engine, and a pair of bevel gears, held in meshing engagement with the pinion, are operatively connected to the first electric motor M1 and the power transmitting member 18 (second electric motor M2).

The power distributing mechanism 16 of the illustrated embodiment has been described above as including one set of planetary gear units, the power distributing mechanism 16 may include two or more sets of planetary gear units that are arranged to function as a transmission having three or more speed positions under a non-differential state (fixed shifting state). In addition, the planetary gear unit is not limited to the single-pinion type, but may be of a double-pinion type.

While the shift operating device 50 of the illustrated embodiment has been described with reference to the shift lever 52 operative to select a plurality of kinds of shift positions $P_{SH}$, the shift lever 52 may be replaced by other type of switches or devices. These may include, for instance: a select switch such as a press-button type switch and a slide-type switch available to select one of a plurality of shift positions $P_{SH}$; a device operative to switch a plurality of shift positions $P_{SH}$ in response not to the manipulation initiated by the hand but to a driver's voice; and a device operative to switch a plurality of shift positions $P_{SH}$ in response to the manipulation initiated by the foot.

While the illustrated embodiment has been described with reference to the shifting range that is established upon manipulating the shift lever 52 to the "M" position, the gear positions may be set, i.e., maximal speed gear positions for respective shifting ranges may be set as the gear positions. In this case, the automatic transmission portion 20 operates so as to allow the gear positions to be switched for executing the shifting action. For example, as the shift lever.52 is manually operated to an up-shift position "+" or a down-shift position "−" in the "M" position, the automatic transmission portion 20 operates so as to allow any of the 1st-speed gear position to the 4th-speed gear position to be set depending on the manipulation of the shift lever 52.

The foregoing merely illustrates the embodiments for illustrating the principles of the present invention. It will be appreciated by those skilled in the art that various modifications and alternatives to those details could be developed in the light of the overall teachings of the disclosure.

What is claimed is:

1. A control device for a vehicular power transmitting apparatus, wherein
the vehicular power transmitting apparatus comprises (i) an electrically controlled differential portion controlling a differential state between a number of rotations of an input shaft connected to a drive-force generating engine, and a number of rotations of an output shaft connected to drive wheels, by controlling an operating state of an electric motor connected to a rotary element of the differential portion, and (ii) a shifting portion forming part of a power transmitting path; and
the control device is operative to control the differential state of the electrically controlled differential portion based on a shifting command when the shifting portion remains under a limited shifting, thereby causing a variation in a drive force at a rate corresponding to the shifting command.

2. The control device for a vehicular power transmitting apparatus according to claim 1, wherein the shifting command is generated in response to a shifting operation of a driver.

3. The control device for a vehicular power transmitting apparatus according to claim 1, wherein the control device varies the number of rotations of the drive-force generating engine to thereby control the differential state of the electrically controlled differential portion.

4. The control device for a vehicular power transmitting apparatus according to claim 2, wherein the control device varies the number of rotations of the drive-force generating engine to thereby control the differential state of the electrically controlled differential portion.

5. The control device for a vehicular power transmitting apparatus according to claim 1, wherein the control device varies a power generating state of the electric motor to thereby control the differential state of the electrically controlled differential portion.

6. The control device for a vehicular power transmitting apparatus according to claim 2, wherein the control device varies a power generating state of the electric motor to thereby control the differential state of the electrically controlled differential portion.

7. The control device for a vehicular power transmitting apparatus according to claim 1, wherein the control device selectively alters the number of rotations of the drive-force generating engine or alters the power generating state of the electric motor depending on a charged state of a battery to thereby control the differential state of the electrically controlled differential portion.

8. The control device for a vehicular power transmitting apparatus according to claim 2, wherein the control device selectively alters the number of rotations of the drive-force generating engine or alters the power generating state of the electric motor depending on a charged state of a battery to thereby control the differential state of the electrically controlled differential portion.

9. The control device for a vehicular power transmitting apparatus according to claim 1, wherein the control device selectively alters the number of rotations of the drive-force generating engine or alters the power generating state of the electric motor depending on a state of the drive-force generating engine to thereby control the differential state of the electrically controlled differential portion.

10. The control device for a vehicular power transmitting apparatus according to claim 2, wherein the control device selectively alters the number of rotations of the drive-force generating engine or alters the power generating state of the electric motor depending on a state of the drive-force generating engine to thereby control the differential state of the electrically controlled differential portion.

11. The control device for a vehicular power transmitting apparatus according to claim 1, wherein the shifting portion of the vehicular power transmitting apparatus comprises a mechanical transmission that varies a speed ratio by varying a torque transmitting path.

12. The control device for a vehicular power transmitting apparatus according to claim 2, wherein the shifting portion of the vehicular power transmitting apparatus comprises a mechanical transmission that varies a speed ratio by varying a torque transmitting path.

13. The control device for a vehicular power transmitting apparatus according to claim 1, wherein the electrically controlled differential portion of the vehicular power transmitting apparatus operates to serve as a continuously variable transmission by controlling an operating state of the electric motor.

14. The control device for a vehicular power transmitting apparatus according to claim 2, wherein the electrically controlled differential portion of the vehicular power transmitting apparatus operates to serve as a continuously variable transmission by controlling an operating state of the electric motor.

15. The control device for a vehicular power transmitting apparatus according to claim 1, wherein the rotary element of the differential portion includes a planetary gear unit having three rotary elements including a first rotary element connected to the input shaft and the engine, a second rotary element connected to the electric motor, and a third rotary element connected to the output shaft.

16. The control device for a vehicular power transmitting apparatus according to claim 1, wherein a total shifting ratio of the vehicular power transmitting apparatus is formed based on a shifting ratio of the shifting portion and a shifting ratio of the electrically controlled differential portion.

17. The control device for a vehicular power transmitting apparatus according to claim 1, wherein the shifting portion is comprised of a planetary gear automatic transmission.

18. The control device for a vehicular power transmitting apparatus according to claim 1, wherein a differential state of the rotation numbers between the input shaft and the output shaft is defined as a differential state of the rotation numbers between the input shaft connected to the drive-force generating engine and a transmitting member connected to drive wheels.

* * * * *